(12) United States Patent
Brückner

(10) Patent No.: US 8,184,650 B2
(45) Date of Patent: May 22, 2012

(54) FILTERING OF REDUNDANT FRAMES IN A NETWORK NODE

(75) Inventor: Dieter Brückner, Unterleiterbach (DE)

(73) Assignee: Siemens Aktiengesellschaft, München (DE)

( * ) Notice: Subject to any disclaimer, the term of this patent is extended or adjusted under 35 U.S.C. 154(b) by 250 days.

(21) Appl. No.: 12/529,412

(22) PCT Filed: Mar. 2, 2007

(86) PCT No.: PCT/DE2007/000392
§ 371 (c)(1),
(2), (4) Date: Sep. 1, 2009

(87) PCT Pub. No.: WO2008/106906
PCT Pub. Date: Sep. 12, 2008

(65) Prior Publication Data
US 2010/0091784 A1    Apr. 15, 2010

(51) Int. Cl.
*H04L 12/28* (2006.01)
(52) U.S. Cl. .......................... 370/412; 710/316; 379/242
(58) Field of Classification Search ............... 340/412, 340/351, 469, 254; 714/4.1
See application file for complete search history.

(56) References Cited

U.S. PATENT DOCUMENTS

| 6,282,669 | B1* | 8/2001 | Imanaka et al. ............ 714/4.1 |
| 6,446,131 | B1 | 9/2002 | Khansari |
| 7,619,987 | B2* | 11/2009 | Mitsumori ............ 370/254 |
| 2003/0147377 | A1* | 8/2003 | Saint Etienne et al. ........ 370/351 |
| 2007/0223533 | A1* | 9/2007 | Kirrmann et al. ............. 370/469 |

FOREIGN PATENT DOCUMENTS

| EP | 0 854610 A2 * | 7/1998 |
| EP | 1657888 A1 | 5/2006 |

* cited by examiner

*Primary Examiner* — Dang Ton
*Assistant Examiner* — Lionel Preval

(57) ABSTRACT

A method of filtering redundant frames including a MAC source address, a frame ID and a CRC value, in a network node with two ports each including a transmitting device and a receiving device, is provided. The transmitting device includes a transmission list in which frames to be transmitted are stored. The receiving device includes a receiving memory for storing a received frame. For filtering redundant frames in a network node, a first frame is received by one of the two ports. After reception of the MAC source address and the frame ID of the first frame in the transmission list of the port, a second frame with the same MAC source address and frame ID is sought. If the second frame is present, the first frame is neither forwarded to a local application nor forwarded to send to other ports, and the second frame is not sent.

19 Claims, 3 Drawing Sheets

FILTERING OF REDUNDANT FRAMES IN A NETWORK NODE

CROSS REFERENCE TO RELATED APPLICATIONS

This application is the US National Stage of International Application No. PCT/DE2007/000392 filed Mar. 2, 2007, claims the benefit thereof and is incorporated by reference herein in its entirety.

FIELD OF INVENTION

The invention relates to a method for filtering redundant frames comprising at least one MAC source address, a frame ID and a CRC value, in a network node comprising at least two ports which each comprise a transmitting device and a receiving device, wherein the transmitting device comprises a transmission list in which frames to be transmitted are stored, and wherein the receiving device comprises a receiving memory for storing a received frame.

The invention also relates to a network node comprising at least two ports which each comprise a transmitting device and a receiving device, wherein the transmitting device comprises a transmission list in which frames to be transmitted are stored and wherein the receiving device comprises a receiving memory for storing a received frame.

BACKGROUND OF INVENTION

A method of this type is used, in particular, in high availability networks wherein frames are transmitted with redundancy. Fundamentally, the requirements that have been fulfilled in conventional Profibus networks must also be capable of being realized in current and future Profinet networks. This means that equipment exchange or the extension of a network can be carried out whilst the rest of the network continues operating (i.e. no loss of the provider-consumer relationships). This has the consequence that a conventional Profibus line (with bus architecture) corresponds in the Profinet environment (point-to-point architecture) to a ring topology.

Where, with a Profibus line, a subscriber must transmit a frame only once, and reaches all other Profibus subscribers therewith, in the modern Profinet environment, a cyclical frame is transmitted in addressed-based manner, in both directions on the ring, and therefore twice. At the feed-in node (switch), it is then ensured that this frame is filtered from the network. This prevents circulating telegrams in the ring (F-bit mechanism).

Present-day applications in the production and manufacturing environment therefore require a production unit ("machine ring") which is equipped with Profinet communication, as a ring structure and therefore having high availability. A plurality of these production units should be linked to one another by an overarching "factory ring". The linking itself must also be implemented with redundancy.

In order to meet the requirements for high availability of a network, the individual rings must be connected together into linked ring structures. This means that frames from one ring must be fed out and then fed in again. However, with the redundancy procedures used today for cyclic communication, the original frame circulating in a simple ring and its duplicate are both fed out. Therefore, in the adjoining ring, the original frame and the duplicate frames are doubled via both ports. This results in four identical cyclic frames in the subsequent ring structure. In general, where a plurality of such rings are connected one behind the other, the number of cyclic frames doubles with each ring topology, and the available bandwidth is halved with each further ring that is connected. As a consequence, given the orders of volume required, cyclic communication cannot be carried out in this way.

The frames circulating in the ring are filtered out of the ring at the feed-in node using the conventionally implemented F-bit mechanism. This means that each cyclic frame fed into the ring must be learned in a memory of the feed-in and coupling switches and, on being received anew, filtered again at the feed-in or coupling switch. Suitable resources must be provided for this, since otherwise feeding in of the frame is not possible.

A highly available network also means that the coupling nodes between the rings are implemented with redundancy. I.e. the ring structures are linked to one another at two or more sites (redundant coupling). In redundantly coupled ring structures of this type, the cyclic frames are fed multiple times into the subsequent ring structure via the two coupling paths and transmitted there via both ports of the coupling switch. The cyclic frames of one direction become extinguished at the other redundant coupling node (through the F-bit mechanism). Nevertheless, doubling of the number of frames takes place at the subsequent coupling nodes and thus, as with simply coupled rings, a halving of the bandwidth for cyclic Profinet communication takes place.

SUMMARY OF INVENTION

Using the conventionally implemented redundancy method for cyclic frames, only simple ring structures can be created wherein all the nodes are present in the ring as subscribers. Structures set apart from the ring (IO controller, Profinet line) or coupled to the ring lead to telegram multiplication and therefore to bandwidth loss on these paths. Therefore, the disadvantages of the conventional method are:

frame doubling on feeding out of a ring topology, bandwidth losses in the ring with multicast frames or frames the destination address (DA) of which has not yet been learned, since these frames have to be transmitted via both ring directions and are only filtered from the ring by the feed-in node (with the F-bit mechanism), high resource requirement, since all the cyclic frames fed or coupled into the ring have to be learned in a filter list and filtered on being received (F-bit mechanism).

With conventional Profinet devices (switches), a redundant coupling of a plurality of ring structures is possible only with the aid of software. This means that the coupling between adjacent ring structures does not take place directly in the switch itself, but that all cyclic frames that are fed out to the adjacent ring must be fed through a software interface. This ensures that, in each case, only one cyclic frame (original or duplicate frame) is fed out at a coupling switch. The feeding in of the cyclic frame is also carried out by means of software, in order to avoid feeding in again a cyclic frame which has already been fed in and which has been transmitted via the redundant coupling path.

The data rate achievable in this way is severely restricted and does not, by any means, meet the required order of volume. Coupling via a plurality of rings (series connection of rings) as is the case, for example, in railway systems, can only be realized with relatively great restrictions. The present-day requirements of the manufacturing and processing industries cannot currently be met.

It is an object of the invention to filter redundant frames in a network node of a network.

This aim is achieved with a method of the aforementioned type in that a first frame is received by one of the at least two ports, and after reception of the MAC source address and the frame ID of the first frame in the transmission list of said port, a second frame with the same MAC source address and frame ID is sought and, if the second frame is present, the first frame is not forwarded to a local application nor is it forwarded to send to other ports of the node, and the second frame is not sent.

The object is also achieved with a network node as claimed in the claims.

In order to support redundant network structures, the problems of the multiple feeding of the redundant cyclical Profinet frames out of the ring and of preventing circulating telegrams within a ring need to be solved. Both problems can be solved with the methods according to the invention of "frame extinguishing in the network". The fundamental principle herein is the fact that, in a redundant system (e.g. a ring topology), a frame fed in via a plurality of ways (typically 2 ways) meets itself again at some point in the network. The two identical frames can meet each other either on the line between two adjacent network nodes or precisely in a network node.

If this property is used in order to extinguish the original and duplicate frame at the site of their meeting, then circulation of frames in the redundant network (typically a ring) and feeding out of both the frames (original and duplicate frame) at a node (switch) is prevented. If a meeting of the two frames is not possible, then the network topology is not redundant. A circulating frame or multiple feed-out cannot take place in this case, and the "frame extinguishing in the network" concept does not have to be used.

If, according to the inventive method, a cyclic frame is received at a port, then once the MAC address and frame ID have arrived, this cyclic frame is sought in the transmission list of the receiving port. All the transmission orders of the port are run through in sequence and checked for equality of MAC source address and frame ID. If there is no matching of the received cyclic frame with the frames to be transmitted in the transmission list, then this received cyclic frame has not yet arrived via another port as a duplicate and can therefore be forwarded to all the other ports for transmitting or can be received from a local application. If, on the other hand, the cyclic frame is found in the transmission list, then the duplicate has already been received via another port and placed in line in the port in question for forwarding.

In redundant network structures, the original and duplicate frame meet again at some point in the network. If it is ensured that, at this meeting site in the network, both the frames extinguish one another, then multiple feeding out to an adjacent network structure and multiple feeding in into the first network structure are prevented. This results in the following advantages:

There is no dependency of the memory resources on the network topology and the order of volume to be transmitted (number of cyclic frames). In the individual nodes, only intermediate storage which reflects the local relationship of two adjacent ports is required. The resources necessary for this are constant and not dependent on the topology of the overall network or the transmission rate (100 Mbit, 1 Gbit).

No intermediate storage of the cyclic frames that have already been fed out or in and therefore no complex search and learn algorithm within such memory are necessary, and this in turn enables shorter latency periods in the nodes (switches) and thus a greater data throughput.

Every possible topology is supported. The concept is suitable for every possible redundant or non-redundant network topology.

No specific parameterization of the switches is necessary. Every switch, whether within a ring or as a coupling switch to a subsequent ring, is similarly parameterized.

In an advantageous faun of the embodiment, the second frame is checked for errors, on the basis of the CRC value and, only if the second frame is fault-free, the first frame is not forwarded to a local application, nor is said first frame forwarded to send to other ports of the node and/or if the second frame is faulty, the second frame is not sent. In this way, the first frame is only filtered out of the network if the second frame has been or will be correctly transmitted and, additionally or alternatively, a faulty second frame is filtered out of the network.

In a further advantageous embodiment, the first frame is checked for errors, on the basis of the CRC value and, only if the first frame is fault-free, the second frame is not sent and/or, if the first frame is faulty, the first frame is not forwarded to a local application, nor is said first frame forwarded to send to other ports of the node. In this way, exactly as in the previous embodiment, the second frame is only filtered out of the network if the first frame has been or will be correctly transmitted and, additionally or alternatively, a faulty first frame is filtered out of the network. The two aforementioned embodiments, considered together, if only one frame is faulty—first or second or original or duplicate—lead to partial filtration of the redundant frames, but this is sufficient to satisfy the requirement, in high availability networks, for the greatest possible guarantee of data security.

In another advantageous embodiment, it is checked whether the second frame is stored completely in the transmission list and, if the second frame is incompletely stored, the first frame is stored in the receiving memory until the second frame is completely stored. This is carried out by means of the store-and-forward method that is implemented as standard in many switches and which is used when checking the frames for fault-free reception.

In another advantageous embodiment, if the second frame is not present, the first frame is forwarded to at least one of the other ports of the node for transmission if the first frame is not exclusively destined for a local application. Thus, frames that are only addressed to the local application—known as unicast frames—are taken out of the network on reaching their destination and are no longer sent to other nodes. By contrast, multicast or broadcast frames which are addressed to more than one recipient are forwarded via the other ports of the first node that are bound into the network.

In a further advantageous embodiment, in the absence of the second frame, the first frame is forwarded to a local application if the first frame is destined for this local application. If the second frame has already been entered in the transmission list, however, said second frame has already been received by the local application.

In another advantageous embodiment, the ports bound into the network are specifically identified and when the first frame is forwarded to other ports of the node for sending, said first frame is forwarded to all the specifically identified other ports for sending. Thus the ports of a node that are bound into a redundant network (also the outlet ports) are specifically identified as redundant ports (R-ports), and a cyclic frame received via an R-port is always forwarded to all the other R-ports.

In a further advantageous embodiment, at least the two most recently sent frames are stored in an additional memory region in the transmission list. This ensures that the redundant frames are also filtered if they meet between two nodes on the network line. If original and duplicate frames meet on the line, given a maximum line length between two nodes of 100 m at 5 ns/m and a transit time through the PHY layer of 0.2 μs for the receiving direction and 0.1 μs for the transmission direction of no more than (0.5+0.3) μs=0.8 μs, both frames are transmitted before they meet at the opposite receiving port. With a 100 Mbit Ethernet, a minimum frame (ca 6 μs) is therefore only partially transmitted. It is thereby ensured that both original frames are entered in the transmission lists of the ports, while the respective duplicate is just being received. This means that extinguishing is possible. However, with a 1 Gbit Ethernet, a frame can be transmitted entirely before it arrives at the opposite receiving port. In order to achieve reliable extinguishing of the original and duplicate frames in this case, it is necessary to provide an additional port-specific intermediate buffer (with a depth of two entries).

In a further advantageous embodiment
- from a faultlessly transmitted frame, an entry with the MAC source address, the frame ID and a transmission time point is stored in an echo list by the transmitting device,
- for a faultlessly received frame, an echo frame comprising at least the MAC source address and the frame ID of the faultlessly received frame is generated by the receiving device and entered in the transmission list of the transmitting device,
- a received echo frame is not forwarded and the MAC source address and the frame ID thereof are compared with the entries in the echo list, wherein given a match, the relevant entry in the echo list is deleted, and
- after expiry of an echo time since the transmission time point of a frame entered in the echo list, the forwarding both of received frames from the receiving memory to others of the ports and of frames to be sent from others of the ports to the transmission list is interrupted.

A frame is only reliably extinguished by its duplicate in the network if both the original and the duplicate frame are transmitted faultlessly. However, if an error occurs somewhere in the network (e.g. a CRC error, a one-sided cable break, conductor break) this can lead to one of the two frames (original or duplicate) lacking or no longer being recognized as such. The previous extinguishing mechanism would then no longer work and circulating frames or multiple feeding out of frames would arise. In order to avoid this, it is necessary to localize a faulty or missing cyclic frame with suitable mechanisms and to introduce suitable measures in the relevant sub-network, that is, at the site of occurrence.

For this purpose, the MAC source address and the frame ID of the faultlessly sent cyclic frame are stored in a port-specific echo list. If the cyclic frame is transmitted with CRC errors, then the frame is not entered in the echo list. In addition, the transmission time point of the cyclic frame is stored. The receiving node generates an echo frame for every correctly received cyclic frame. A cyclic frame that is not correctly received is not acknowledged with an echo frame. Advantageously, the echo frame contains only the frame information necessary for a comparison and therefore comprises only a frame header without data bytes. If an echo frame is received, said frame is essentially not forwarded and a comparison is made between the MAC source address, the frame ID and the entries in the echo list. A match indicates that the path between the nodes is fault-free (no interruption or disruption). If the port recognizes that the echo time has elapsed between the transmission time point stored in the echo list and the actual time point without a corresponding echo frame having arrived, then the path (forward or return line) between the nodes is faulty. In this case, the forwarding of all subsequent cyclic frames (in the transmitting and receiving directions) at the relevant port is interrupted. The local path monitoring no longer operates. The interruption of the forwarding ("forwarding block" is active) prevents the reverse-directed duplicate frame circulating through the now missing original frame, since said duplicate frame runs into the blocked receiving port and is therefore not forwarded. A cyclic frame fed in via another node runs from both sides (original and duplicate frame) to the forwarding block and is filtered there at the receiving port or is not forwarded at the transmitting port. Summarizing, the following functions must be carried out by every redundant port:

- For each sent cyclic frame, an echo frame must be sent back locally by the opposite port of the adjacent switch.
- An echo frame is only generated if the cyclic frame has been received faultlessly.
- Within an echo time following a sent cyclic frame, said frame must have been received again as an echo.
- The respective transmitting port stores the echo-relevant frame data (MAC source address, frame ID, sending time) in a port-specific echo ring buffer (echo list).
- If, at the calculated time point (after elapse of the echo time) no expected echo frame is received, the forwarding of the cyclic frames from/to the respective port is blocked to/from all other ports. However, frame reception with regard to echo formation remains for all subsequent cyclic frames.

In another advantageous embodiment, the echo frame generated by the receiving device is entered with the highest priority in the transmission list of the transmitting device. In order to return the echo frames as directly as possible to the transmitting node, said echo frames are added to the transmission list with the highest priority. An echo frame can therefore only be delayed by a frame which is just then running.

In another advantageous embodiment, the maximum elapsed time between storing an entry in the echo list and receiving the associated echo frame is chosen as the echo time. Since, in this exemplary embodiment, an echo frame can only be delayed by a frame which is just then running, the maximum elapsed time is given by twice a "line delay" at the maximum line length (typically at 5 ns/m and twice 100 m, corresponding to 1 μs) plus a "bridging delay", the latent period in the adjacent switch (corresponding to the PHY running time of 0.3 μs (see above)) plus the delay time which is caused by a maximum frame before the echo frame. In the case of a maximum frame of typically 1530 byte, this would be another 12.24 μs in a 1 Gbit Ethernet or 122.4 μs in a 100 Mbit Ethernet. Overall, therefore, the result is an echo time of 13.54 μs for a 1 Gbit Ethernet and 123.7 μs for a 100 Mbit Ethernet.

In a further advantageous embodiment, in the echo list for a 100 Mbit Ethernet, the last 20 entries are stored and, for a 1 Gbit Ethernet, the last 22 entries are stored. Assuming a maximum line length (100 m) to the adjacent switch, a maximum quantity of frame data must be stored such that the adjacent switch just sends one frame of maximum length and that only frames of minimum length (64 bytes plus 8 bytes preamble) with an "inter-package gap" of 96 bits (12 bytes) are sent from the sending port. The maximum entries to be stored are calculated from the maximum delay time divided by the time necessary for sending a minimum frame (plus the "inter-package gap"), that is, 0.672 μs with a 1 Gbit Ethernet and 6.72 μs with a 100 Mbit Ethernet.

In a further advantageous embodiment, the interruption of the forwarding at the end of a current communication cycle is lifted. A condition thereof is that at this time point all the original and duplicate frames in the network have been transmitted, otherwise the lifting of the block can again lead to circulating cyclic frames.

In a further advantageous embodiment, the redundant frames are provided with a cycle number which gives the communication cycle at the time point of feeding the frames into the network.

In a further advantageous embodiment, the first frame is checked for errors using the CRC value and, only if the frame is faulty and the cycle number does not match the current communication cycle, the frame is not forwarded to a local application nor forwarded to send to other ports of the node. This is intended to ensure that, at the cycle end, all the original and duplicate frames have been transmitted. Therefore, on receipt in each switch, only those cyclic frames which were fed in during the current cycle are correctly forwarded (without CRC errors). All the other cyclic frames are also sent with CRC errors or filtered.

In a further advantageous embodiment, the redundant frames are provided with a TTL ("time-to-live") timer and if the TTL timer has a value of zero, the first frame is not forwarded to a local application, nor forwarded to send to other ports of the node. It is essentially achieved, with the elapsing of the TTL timer, that a circulating cyclic frame can sooner or later be filtered out of the network. But for as long as the TTL timer has not elapsed, the circulating frame ensures impairment of the Ethernet communication. Breakdown in the provider-consumer relationship and thus, disruption of the operational process cannot be avoided with the TTL timer. The TTL timer can only provide a guarantee of a "recovery" of the network after a certain time (depending on the initial value of the timer). The TTL timer does serve, however, as an "assurance" and should not run out due to the echo monitoring. If, however, despite the local echo monitoring between adjacent Ethernet ports, a cyclic frame is not extinguished or is not filtered by the block on a ring port, then the cyclic frame which then circulates leads to continuous flooding of the whole network. Useful data or management communication is still possible only to a limited extent or not at all. In this case (without the TTL timer), a new start of the system is the only possibility for "repair" of the network and thus for filtering the circulating cyclic frames. In order to prevent this, the "time-to-live" counter is implemented as a further mechanism (as a fall-back) which enables each circulating cyclic frame to be destroyed once the TTL timer has expired. The TTL timer is carried in a TTL field in each cyclic frame. The TTL timer in the cyclic frame is, for example, an 8-bit field (0-255) and is set to a fixed value by the feed-in node.

In a further advantageous embodiment, the TTL timer of the first frame is decremented by one on receipt of the first frame. Based on the defined value range of the TTL timer, a maximum number of switches (nodes) to be passed through, of typically 255 (with an 8-bit field), is possible.

In a further advantageous embodiment, the TTL timer of the first frame is decremented by one on receipt of the first frame if the network node is linked at more than two ports to other network nodes of the network. This relates to coupling switches which, apart from connections to the network ring itself, have a further connection to, for example, an adjacent network ring, i.e. the TTL counter is decremented by one only on receipt at a coupling switch. Given precise knowledge of the network topology, an exact TTL value can be set on feeding-in, since the number of coupling nodes can be counted from the feeding-in ring to the target ring and entered in the cyclic frame as a TTL value. Faster filtration of the circulating cyclic frame can thus be achieved.

BRIEF DESCRIPTION OF THE DRAWINGS

The invention will now be described in greater detail making reference to an exemplary embodiment shown in the drawings, in which.

DETAILED DESCRIPTION OF INVENTION

Figure 1:
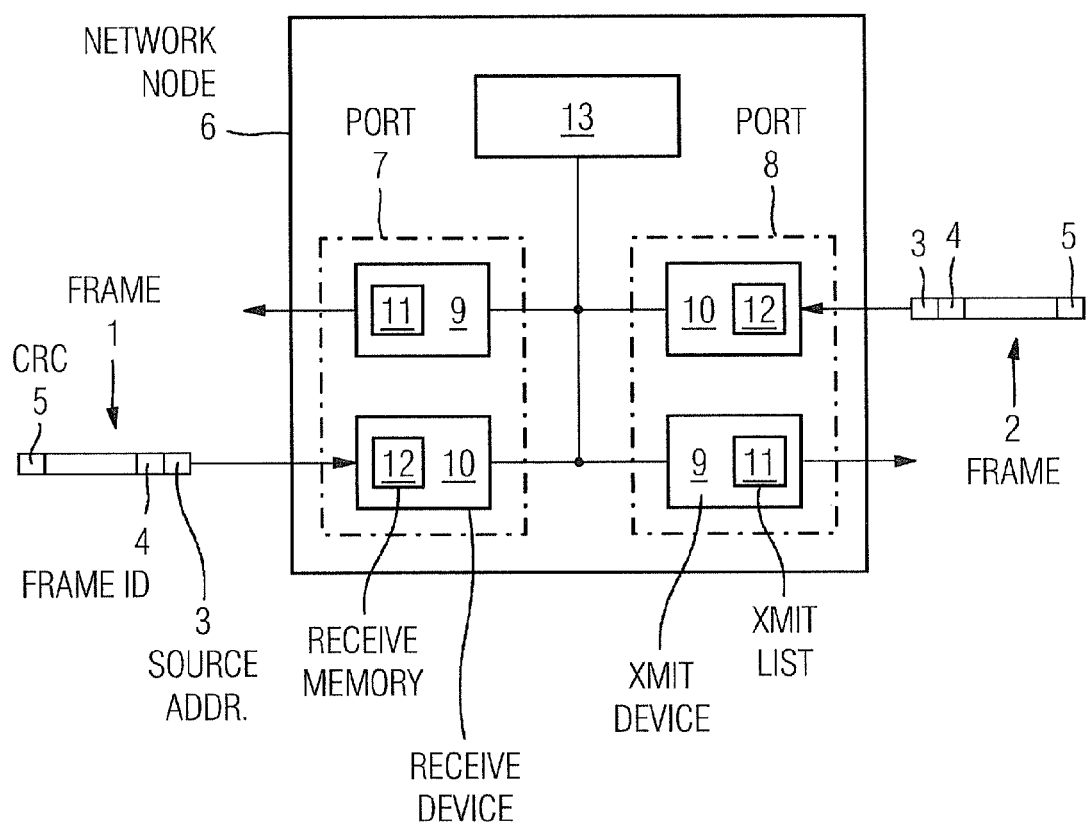
FIG. 1 is a network node on receipt of two frames.

FIG. 1 shows a network node 6 with a local application 13 (e.g. a local API "Application Programming Interface") and two ports 7, 8. The two ports 7, 8 each comprise a transmitting device 9 with a transmission list 11 and a receiving device 10 with a receiving memory 12. A frame 1, 2 is received at the receiving devices 10 of the two ports 7, 8, wherein both frames 1, 2 comprise at least a MAC source address 3, a frame ID 4 and a CRC value 5. Once the MAC source address 3 and the frame ID 4 have been received, said frame 1, 2 is sought in the transmission list of the respective receiving port 7, 8. All the transmission orders of the port 7, 8 are run through in the respective transmission list 11 in sequence and are checked for matching of the MAC source address 3 and the frame ID 4. If there is no match of the received cyclic frame 1, 2 with the frame to be sent from the transmission list 11, then this received cyclic frame 1, 2 has not yet arrived via another port 8 or 7 as a duplicate and can therefore be forwarded to all other ports 8, 7 or received by a local application 13—or both, depending on whether the frame is a unicast, multicast or broadcast frame.

In the example shown in FIG. 1, frame 2 should reach the receiving device 10 of the port 8 before frame 1 is received by the port 7. The inventive method, which naturally is used identically for the frame 2 received in the port 8, will now be described from the viewpoint of the frame 1 received in the port 7, i.e. frame 1 represents the first frame 1 received at a first port 7 (the "original") and frame 2 represents the second frame 2 received at another port 8 (the "duplicate"). After receipt of the MAC source address 3 and the frame ID 4 of the first frame 1 at the first port 7, a cyclic second frame 2 with the same MAC source address 3 and frame ID 4 is sought in the transmission list 11 of the first part 7. Since the duplicate 2 has already been received via another port 8 and placed in line in the first port 7 for forwarding, the second frame 2 is also entered in the transmission list 11 of the first port 7. Thus the first frame 1 is not forwarded to a local application 13 nor forwarded to send to other ports 8 of the node 6 for sending and the second frame 2 is not sent, i.e. the duplicate 2 is set to "invalid" in the transmission list 11 of the port 7. As a consequence, both frames 1, 2 have extinguished one another and have thus been successfully filtered out of the network.

Figure 2:
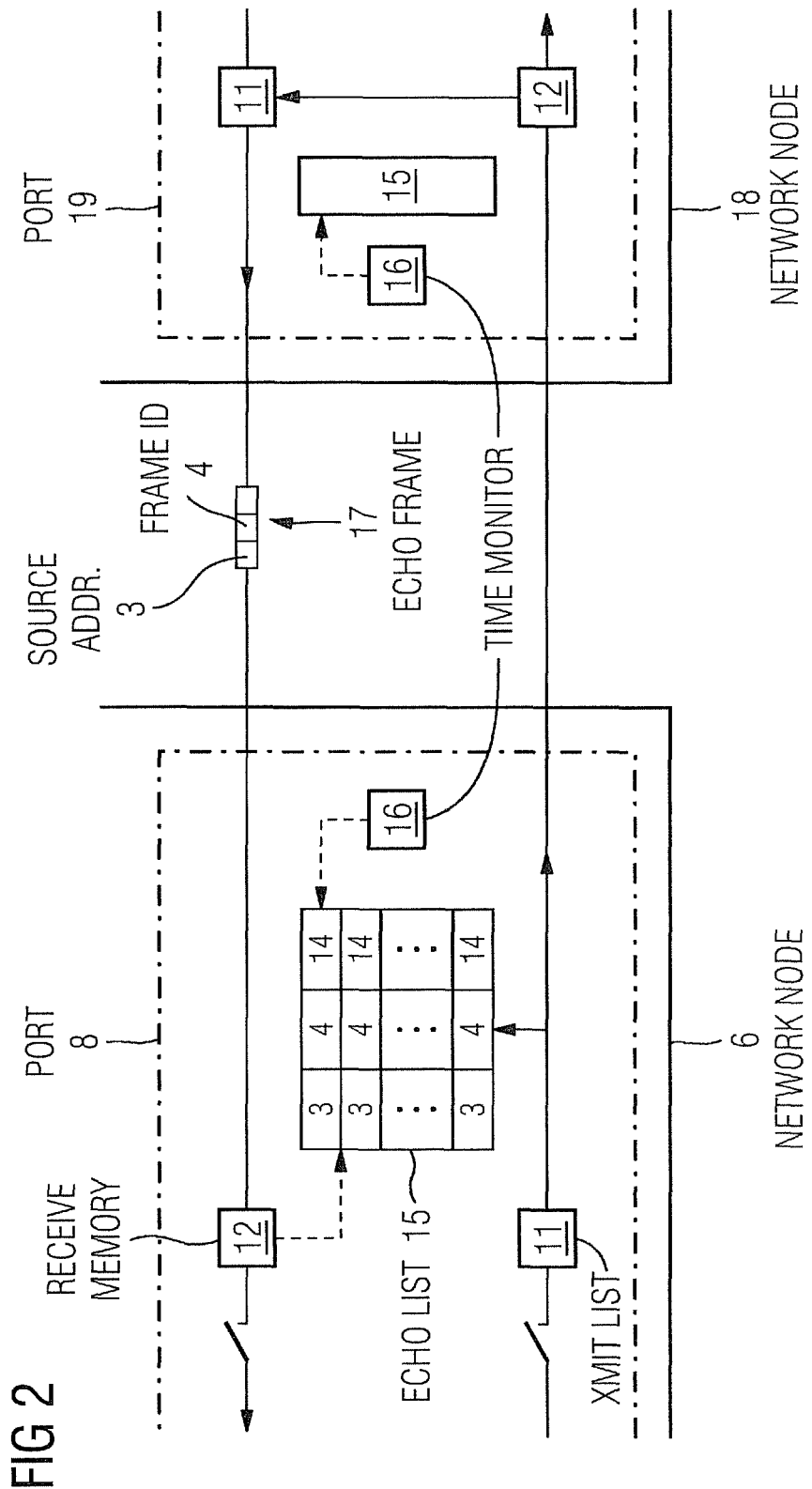
FIG. 2 is a port on receipt of an echo frame.

FIG. 2 shows a port 8 of a network node 6 which is connected to a port 19 of an adjacent network node 18. In a port-specific echo list 15, the MAC source address 3, the frame ID 4 and the transmission time point 14 of faultlessly transmitted cyclic frames are stored. If the cyclic frame is transmitted with a CRC error, then no entry is made in the echo list. On every correctly received cyclic frame, the receiving node 18 generates an echo frame 17. An incorrectly received cyclic frame is not acknowledged in the node 18 with an echo frame 17. The echo frame 17 contains at least the frame information necessary for a comparison and thus comprises, for example, only a frame header with a MAC destination address, a MAC source address 3, a type field and a frame ID 4 without data bytes. The frame length is therefore fixed and limited to 24 or 28 bytes (including the CRC). In order to send back the echo frames 17 as directly as possible to the transmitting node 6, said echo frames are added to the transmission list 11 of the node 18 with the highest priority. An echo frame 17 can therefore only be delayed by a frame running straight.

When the echo frame 17 arrives at the node 6, it is fundamentally not passed on and a comparison of the MAC source address 3 and the frame ID 4 with the entries in the echo list 15 is made. A hit in the list shows that the path between the nodes 6 and 18 is fault-free (no interruption or disruption). If the node 6 detects, by means of time monitoring 16, that an echo time has elapsed between the sending time 14 stored in the echo list 15 and the actual time point without a corresponding echo frame 17 arriving, then the path (forward or reverse line) between the nodes 6 and 18 is faulty. In this case, the forwarding of all subsequent cyclic frames (in the sending and receiving directions) at the relevant port 8 is interrupted until the end of the communication cycle. However, frame reception for echo formation for all subsequent cyclic frames is retained. This corresponds exactly to the situation described: forwarding is interrupted (shown at left in the figure), and an echo frame 17 is sent from the node 18 to the node 6. The local path monitoring therefore continues functioning.

The interruption of forwarding until the cycle end ("forward block" is active) prevents a reverse-directed duplicate frame circling through the now missing original frame, since said original frame runs into the blocked port 8 of the node 6 and thus is not forwarded. A cyclic frame fed in via another node 18 runs from both sides to the forwarding block in the node 6 and is filtered there at the receiving port 8 or is not forwarded at the transmitting port.

Figure 3:
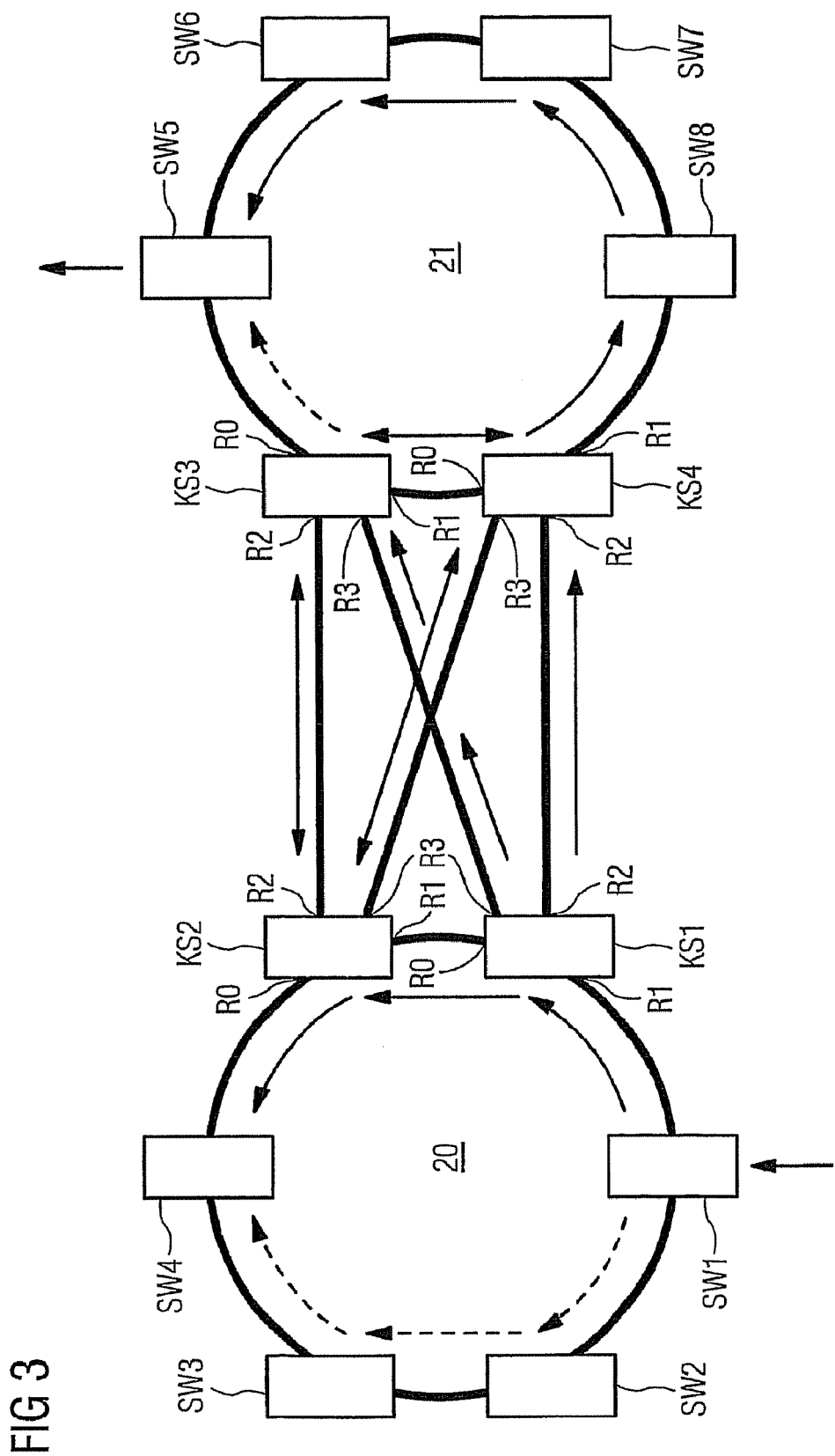
FIG. 3 is an illustration of two multiple-redundantly coupled network rings.

FIG. 3 shows a multiple-redundant coupling of two network rings 20, 21 as it has to be implemented in order to guarantee that a network is still available even on the failure of a coupling switch KS1-KS4 in each ring 20, 21. The ring 20 comprises the switches (network nodes) SW1-SW4 and the coupling switches KS1 and KS2, whilst the ring 21 comprises the switches SW5-SW8 and the coupling switches KS3 and KS4. Each of the coupling switches KS1-KS4 is linked to each of the others, resulting in the multiple-redundant coupling of the two network rings 20, 21. The ports bound into the network of the switches SW1-SW8 and of the coupling switches KS1-KS4 are specifically identified as redundant ports, R-ports, which in the figure are shown only for the coupling switches KS1-KS4 as R0-R3.

Via the network node SW1 in the ring 20, a cyclic frame which is addressed to the node SW5 in the ring 21 is fed in and sent in both directions as the original (solid arrow) and the duplicate frame (dashed arrow). Via the coupling switches KS1 and KS2, the original frame is fed out in each case and later, in the switch SW4, is then extinguished with the duplicate frame in the ring 20. The fed-out original frame is then fed, again redundantly in the ring 21, via both the R-ports R0 and R1, to the two coupling switches KS3 and KS4. In the process, the two frames which were fed in via port R1 of the coupling switch KS3 and port R0 of the coupling switch KS4 extinguish one another, so that only the frames fed in via the port R0 of the coupling switch KS3 and via the port R1 of the coupling switch KS4 remain and these again effectively comprise an original frame and a duplicate frame. These run in opposing directions through the ring 21 and are also both received by the network node SW5, but in the node SW5, one of the frames is destroyed (by frame extinguishing), so that only one frame is received by the local application.

A more exact consideration illustrates the fate of the frame running between the coupling switches KS1-KS4: KS1 firstly contains the original frame fed in by the switch SW1 and, in the next step, sends this frame to all the other coupling switches KS2-KS4, which in turn, in the next step, send the frame received at the respective receiving port to all the other R-ports. As a result, it is not only the frames between KS3 and KS4 which become extinguished, as described above, but also the frames between KS2 and KS3 and between KS2 and KS4. The redundant frames meet one another on the path between the coupling switches KS2-KS4. However, as already explained in the description, this does not play any role with a 100 Mbit Ethernet, since each frame has not yet been sent fully when the associated "duplicate" is received, i.e. they are still entered in the transmission list and extinguishing can therefore take place. In the case of a 1 Gbit Ethernet, the disappearance of a frame from the transmission list due to a completed sending is prevented by an additional buffer memory in the transmission list of at least two entries, so that extinguishing of the frames is ensured in this case. This additional buffer memory can also be the echo list described above, which contains all the essential frame information, such as the MAC source address and frame ID. As a result of the inventive method of filtering redundant frames, a frame fed with redundancy into a network ring 20 is fed only once with redundancy into an adjacent network ring 21, even where there is multiple redundant coupling to said adjacent network ring 21.

Summarizing, the invention relates to a method for filtering of redundant frames which comprise at least a MAC source address, a frame ID and a CRC value, in a network node comprising at least two ports which each comprise a transmitting device and a receiving device, wherein the transmitting device comprises a transmission list in which frames to be transmitted are stored, and wherein the receiving device comprises a receiving memory for storing a received frame. In order to filter redundant frames in a network node of a network, it is proposed, in the aforementioned method, that a first frame is received by one of said port, and after reception of the MAC source address and the frame ID of the first frame in the transmission list of said port, a second frame with the same MAC source address and frame ID is sought and, if the second frame is present, the first frame is not forwarded to a local application, nor is it forwarded to send to other ports of the node, and the second frame is not sent.

The invention claimed is:

1. A method of filtering redundant frames including a MAC source address, a frame ID and a CRC value, in a network node with two ports, each port including a transmitting device and a receiving device, the transmitting device including a transmission list in which frames to be transmitted are stored, and the receiving device including a receiving memory for storing a received frame, the method comprising:
receiving a first frame from a network by a first one of the two ports; and
after reception of the MAC source address and the frame ID of the first frame, seeking a second frame in the transmission list of the first port, the second frame including the same MAC source address and frame ID as the first frame,
wherein, when the second frame is present, the first frame is not forwarded to a local application and is not forwarded to any other ports of the node, and the second frame is not forwarded on the network by the node;
wherein, after the receiving of the first frame, if the second frame is not present in the node, and if the first frame is not exclusively destined for a local application, then the first frame is forwarded on the network by the node.

2. The method as claimed in claim 1, further comprising: checking the second frame for errors based upon the CRC value, wherein, only when the second frame is fault-free, the first frame is not forwarded to a local application and is not being forwarded to other ports of the node.

3. The method as claimed in claim 1, further comprising: checking the second frame for errors based upon the CRC value, wherein, when the second frame is faulty, the second frame is not forwarded on the network from the node.

4. The method as claimed in claim 1, further comprising: checking the first frame for errors based upon the CRC value, wherein, only when the first frame is fault-free, the second frame is not forwarded on the network from the node.

5. The method as claimed in claim 1, further comprising: checking the first frame for errors based upon the CRC value, wherein, when the first frame is faulty, the first frame is not forwarded to a local application, nor is the first frame forwarded to other ports of the node.

6. The method as claimed in claim 1, further comprising: checking whether the second frame is stored completely in the transmission list of the first port, wherein, when the second frame is incompletely stored, the first frame is stored in the receiving memory of the first port until the second frame is completely stored.

7. The method as claimed in claim 1, wherein in the absence of the second frame, the first frame is forwarded to a local application when the first frame is destined for the local application.

8. The method as claimed in claim 1, wherein ports bound into the network are specifically identified and when the first frame is forwarded to other ports of the node for sending, the first frame is forwarded to all the specifically identified other ports for sending.

9. The method as claimed in claim 1, wherein at least the two most recently sent frames are stored in an additional memory region in the transmission list of the first port.

10. The method as claimed in claim 1,
wherein, from a faultlessly transmitted frame, an entry with the MAC source address, the frame ID and a transmission time point is stored in an echo list by the transmitting device,
wherein, for a faultlessly received frame, an echo frame comprising at least the MAC source address and the frame ID of the faultlessly received frame is generated by the receiving device and entered in the transmission list of the transmitting device,
wherein a received echo frame is not forwarded and the MAC source address and the frame ID thereof are compared with the entries in the echo list, wherein given a match, the relevant entry in the echo list is deleted,
wherein, after expiry of an echo time since the transmission time point of a frame entered in the echo list, the forwarding both of received frames from the receiving memory to others of the ports and of frames to be sent from others of the ports to the transmission list is interrupted.

11. The method as claimed in claim 10, wherein the echo frame generated by the receiving device is entered with a highest priority in the transmission list of the transmitting device.

12. The method as claimed in claim 11, wherein a maximum elapsed time between storing an entry in the echo list and receiving the associated echo frame is chosen as the echo time.

13. The method as claimed in claim 10, wherein the interruption of the forwarding at the end of a current communication cycle is lifted, and the redundant frames are provided with a cycle number which indicates the communication cycle at the time of feeding the frames into the network.

14. The method as claimed in claim 13, further comprising: checking the first frame for errors based upon the CRC value, wherein, only when the frame is faulty and the cycle number does not match the current communication cycle, the frame is not forwarded to a local application and is not forwarded to other ports of the node.

15. The method as claimed in claim 1, wherein the redundant frames are provided with a TTL ("time-to-live") timer and, when the TTL timer has a value of zero, the first frame is not forwarded to a local application, nor forwarded to other ports of the node.

16. The method as claimed in claim 15, wherein the TTL timer of the first frame is decremented by one on receipt of the first frame.

17. The method as claimed in claim 15, wherein the TTL timer of the first frame is decremented by one upon receipt of the first frame when the network node is linked at more than two ports to other network nodes of the network.

18. A network node, comprising:
two ports, each port including a transmitting device and a receiving device,
wherein the transmitting device includes a transmission list in which frames to be sent are stored, and
wherein the receiving device includes a receiving memory for storing a received frame; and
means for carrying out a method of filtering redundant frames including a MAC source address, a frame ID and a CRC value, the method comprising:
receiving a first frame from a network by a first one of the two ports; and
after reception of the MAC source address and the frame ID of the first frame, seeking a second frame in the transmission list of the first port, the second frame including the same MAC source address and frame ID as the first frame,
wherein, when the second frame is present, the first frame is not forwarded to a local application and is not forwarded to other ports of the node, and the second frame is not forwarded on the network by the node; and
wherein, after the receiving of the first frame, if the second frame is not present in the node, and if the first frame is not exclusively destined for a local application, then the first frame is forwarded on the network by the node.

19. A method for filtering data communications frames in a node on a bi-directional network ring, the method comprising:
receiving a first frame into the node from a first direction on the network ring;
determining whether a redundant second frame has been received into the node wherein the first and second frames comprise identical frame IDs and identical sending addresses;
wherein, upon the receiving of the first frame, if the redundant second frame is not present in the node, and if the first frame is not exclusively destined for a local application, then the first frame is forwarded onto the network ring in the first direction;

wherein, upon the receiving of the first frame, if the redundant second frame is present in the node, then neither the first frame nor the second frame is forwarded on the network ring;

wherein if the first and second frames arrive simultaneously at the network node, both frames are extinguished therein and are not forwarded on the network ring.

* * * * *